United States Patent [19]

van Heijst

[11] 4,097,072
[45] Jun. 27, 1978

[54] CONDUIT WITH CARDAN JOINT

[75] Inventor: Willem Jan van Heijst, Monte-Carlo, Monaco

[73] Assignee: N. V. Industrieele Handelscombinatie Holland, Rotterdam, Netherlands

[21] Appl. No.: 781,422

[22] Filed: Mar. 25, 1977

Related U.S. Application Data

[63] Continuation of Ser. No. 653,457, Jan. 29, 1976, abandoned.

[30] Foreign Application Priority Data

Jan. 29, 1975 Netherlands .......................... 7501057

[51] Int. Cl.² ............................................. F16L 27/00
[52] U.S. Cl. ..................................... 285/114; 285/226
[58] Field of Search .............. 285/114, 226, 265, 227, 285/228, 229, 9 R

[56] References Cited

U.S. PATENT DOCUMENTS

| | | | |
|---|---|---|---|
| 1,351,875 | 9/1920 | Schreiber .......................... | 285/226 X |
| 2,196,676 | 4/1940 | Johnson et al. ................... | 285/226 X |
| 2,998,270 | 8/1961 | Watkins ............................. | 285/265 |
| 3,450,423 | 6/1969 | Favre ................................ | 285/279 X |
| 3,663,044 | 5/1972 | Contrevas et al. ................ | 285/226 |
| 3,770,303 | 11/1973 | Hallett .............................. | 285/226 X |

*Primary Examiner*—Thomas F. Callaghan
*Attorney, Agent, or Firm*—Young & Thompson

[57] ABSTRACT

Rigid conduit sections have a flexible hose interconnecting their ends with in a cardan joint. One end of the hose has a flange that rotatably seals in fluidtight relationship with a flange on the adjacent end of the associated rigid pipe section, thereby to relieve torsion in the hose.

1 Claim, 1 Drawing Figure

U.S. Patent June 27, 1978 4,097,072
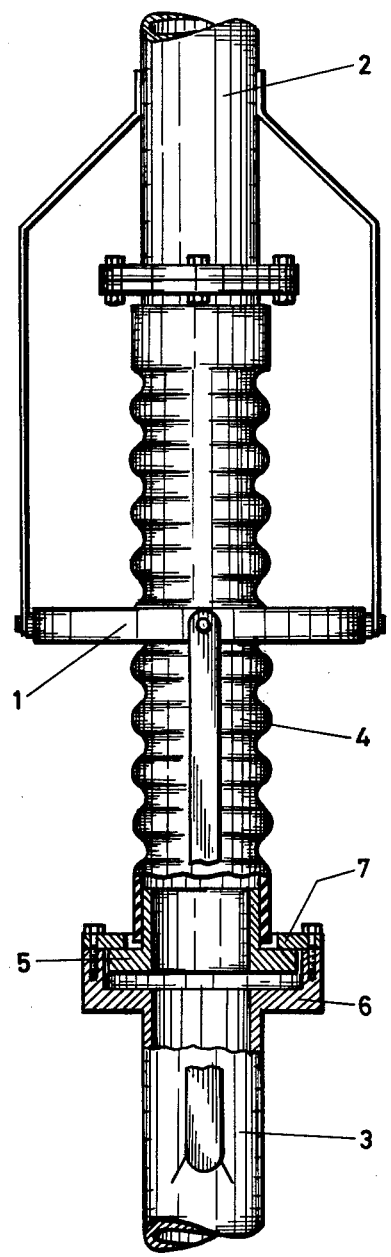

CONDUIT WITH CARDAN JOINT

This is a continuation, division, of application Ser. No. 653,457, filed Jan. 29, 1976 and now abandoned.

The invention relates to a conduit with cardan joint or gimbal ring (the two terms being used interchangeably herein having a hose at the location of the cardan joint, connecting the rigid conduit-pieces mounted to said joint. Similar conduits with cardan joints are known. With a cardan joint the fact occurs that, if the angle distortions over both axes are not equal or the angle distortion over one of the axes is not equal to zero, then the interconnected hose in the cardan joint is loaded in torsion. In the long run with high-loaded hoses this can have damages as a result. Although inherent to a cardan joint, one is not aware of this phenomenon in this technique.

The invention consists in that one has discerned this and has found a solution for it. The solution according to the invention consists in that the hose at one end has been provided with a flange, which flange turnable around the axis has been liquid-tight locked up in a socket with locking flange on one of the rigid conduit-pieces. Herewith it is achieved that the hose can follow the distortions of the one conduit without essentially loading in torsion the interconnected hose in the cardan joint.

The invention now will be elucidated by means of the drawing in which the FIGURE shows a front-view of the cardan joint with hose and by which the flange, which is turnable around the axis of the conduit, has been indicated in cross section. The cardan joint or gimbal ring 1, indicated in the FIGURE, connects both conduits 2 and 3 by means of the hose 4, which hose has been provided with a turnable flange 5, which has been locked up in a socket 6 with a locking flange 7.

Thus, the present invention comprises, in a pair of rigid conduit sections 2, 3 having ends disposed adjacent each other, a hose 4 extending between and interconnecting the adjacent ends of the conduit sections, a gimbal ring 1 surrounding hose 4, means interconnecting gimbal ring 1 and the end of conduit section 3 for relative rotation about a first axis, and means interconnecting gimbal ring 1 and the end of conduit section 2 for relative rotation about a second axis perpendicular to that first axis; the improvement comprising a first annular flange 5 carried by one end of hose 4, a second annular flange 7 carried by the end of conduit section 3, flange 5 having a sealing surface thereon on the same side thereof as conduit section 2, flange 7 having a sealing surface thereon on the opposite side thereof from conduit section 2, the sealing surfaces of flanges 5 and 7 being in sliding sealing contact with each other, whereby torsional stresses on hose 4 are relieved by the sliding of these surfaces on each other.

What I claim is:

1. In a conduit comprising a pair of rigid conduit sections having ends disposed adjacent each other, a hose extending between and interconnecting said adjacent ends of said conduit sections, a gimbal ring surrounding said hose, means interconnecting said gimbal ring and said end of one said conduit section for relative rotation about a first axis, and means interconnecting said gimbal ring and said end of the other said conduit section for relative rotation about a second axis perpendicular to said first axis; the improvement comprising a first annular flange carried by one end of said hose, a second annular flange carried by said end of said one conduit section, said first annular flange having a sealing surface thereon on the same side thereof as said other conduit section, said second annular flange having a sealing surface thereon on the opposite side thereof from said other conduit section, said sealing surfaces being in sliding sealing contact with each other, whereby torsional stresses on said hose are relieved by the sliding of said surfaces on each other.

* * * * *